United States Patent
Johnston, VII

(10) Patent No.: US 10,011,049 B1
(45) Date of Patent: *Jul. 3, 2018

(54) FIBER-REINFORCED MOLDING COMPOUNDS AND METHODS OF FORMING AND USING THE SAME

(71) Applicant: Aerlyte, Inc., Birmingham, MI (US)

(72) Inventor: Christopher Johnston, VII, Birmingham, MI (US)

(73) Assignee: Aerlyte, Inc., Petoskey, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/657,948

(22) Filed: Jul. 24, 2017

(51) Int. Cl.
| B29B 11/16 | (2006.01) |
|---|---|
| B29B 11/10 | (2006.01) |
| B29C 43/18 | (2006.01) |
| B29B 7/42 | (2006.01) |
| B29K 105/00 | (2006.01) |
| B29K 105/08 | (2006.01) |
| B29K 307/04 | (2006.01) |

(52) U.S. Cl.
CPC .............. *B29B 11/16* (2013.01); *B29B 7/42* (2013.01); *B29B 11/10* (2013.01); *B29C 43/18* (2013.01); *B29K 2105/0872* (2013.01); *B29K 2105/253* (2013.01); *B29K 2307/04* (2013.01)

(58) Field of Classification Search
None
See application file for complete search history.

(56) References Cited

U.S. PATENT DOCUMENTS

| 3,728,056 | A | 4/1973 | Theysohn |
|---|---|---|---|
| 3,746,489 | A | 7/1973 | Rizzi et al. |
| 5,110,275 | A | 5/1992 | Scheuring |
| 5,185,117 | A | 2/1993 | Hawley |
| 5,230,852 | A | 7/1993 | Golmanavich |
| 5,879,602 | A | 3/1999 | Scheuring |
| 5,935,508 | A | 8/1999 | Fernyhough et al. |
| 6,186,769 | B1 | 2/2001 | Hawley |
| 6,221,293 | B1 | 4/2001 | Brussel et al. |
| 6,364,518 | B1 | 4/2002 | Gleich et al. |

(Continued)

FOREIGN PATENT DOCUMENTS

| WO | 20010112702 A1 | 2/2001 |
|---|---|---|
| WO | 2008119560 A1 | 10/2008 |
| WO | 2014008917 A1 | 1/2014 |

OTHER PUBLICATIONS

Application Initiated Interview Summary dated Nov. 29, 2017 for U.S. Appl. No. 15/657,863, 3 pages.

(Continued)

*Primary Examiner* — Monica Huson
(74) *Attorney, Agent, or Firm* — Brooks Kushman P.C.

(57) ABSTRACT

A method of forming a fiber-reinforced molding compound. The method includes establishing a melt stream of a source material including a first polymeric material and dosing a composite material into the melt stream. The composite material includes pre-impregnated reinforcing fibers and a second polymeric material. The method further includes forming a molding compound from the source and composite materials and dispensing the molding compound from the extruder. The first and second polymeric materials are different than each other to introduce a functionality into the molding compound that is not present in the second polymeric material. The method further includes using the molding compound to produce a part.

18 Claims, 6 Drawing Sheets

(56) References Cited

U.S. PATENT DOCUMENTS

| | | |
|---|---|---|
| 6,444,153 B1 | 9/2002 | Shah et al. |
| 6,550,954 B1 | 4/2003 | Chszaniecki |
| 6,616,971 B2 | 9/2003 | Evans |
| 8,133,929 B2 | 3/2012 | Hoefflin et al. |
| 2006/0103045 A1 | 5/2006 | O'Brien-Bemini et al. |
| 2007/0007685 A1 | 1/2007 | Gleich et al. |
| 2011/0002190 A1 | 1/2011 | Tardif |
| 2012/0029145 A1 | 2/2012 | Brown |
| 2013/0149521 A1 | 6/2013 | Nelson et al. |
| 2014/0065257 A1 | 3/2014 | Kaisha |
| 2015/0336369 A1 | 11/2015 | Bae et al. |
| 2016/0346957 A1 | 12/2016 | Biemond et al. |

OTHER PUBLICATIONS

Application Initiated Interview Summary dated Nov. 29, 2017 for U.S. Appl. No. 15/657,934, 3 pages.

Application Initiated Interview Summary dated Nov. 29, 2017 for U.S. Appl. No. 15/657,770, 3 pages.

Amendment & Terminal Disclaimer filed Dec. 12, 2017 to Non-final Office Action dated Oct. 10, 2017 for U.S. Appl. No. 15/657,741, 11 pages.

Amendment & Terminal Disclaimer filed Dec. 12, 2017 to Non-final Office Action dated Sep. 22, 2017 for U.S. Appl. No. 15/657,863, 15 pages.

Amendment & Terminal Disclaimer filed Dec. 12, 2017 to Non-final Office Action dated Sep. 19, 2017 for U.S. Appl. No. 15/657,934, 15 pages.

Amendment filed Dec. 12, 2017 to Non-final Office Action dated Sep. 19, 2017 for U.S. Appl. No. 15/657,770, 12 pages.

Non-final Office Action dated Oct. 10, 2017 for U.S. Appl. No. 15/657,741, 6 pages.

Non-final Office Action dated Sep. 22, 2017 for U.S. Appl. No. 15/657,863, 19 pages.

Non-final Office Action dated Sep. 19, 2017 for U.S. Appl. No. 15/657,934, 20 pages.

Non-final Office Action dated Sep. 19, 2017 for U.S. Appl. No. 15/657,770, 17 pages.

Final Office Action dated Apr. 2, 2018 for U.S. Appl. No. 15/657,863, filed Jul. 24, 2017, 14 pgs.

Final Office Action dated Apr. 2, 2018 for U.S. Appl. No. 15/657,934, filed Jul. 24, 2017, 14 pgs.

Final Office Action dated Apr. 2, 2018 for U.S. Appl. No. 15/657,770, filed Jul. 24, 2017, 18 pgs.

Final Office Action dated Feb. 13, 2018 for U.S. Appl. No. 15/657,741, filed Jul. 24, 2017, 5 pages.

Notice of Allowance dated Mar. 21, 2018 for U.S. Appl. No. 15/657,741, filed Jul. 24, 2017, 11 pages.

FIBER-REINFORCED MOLDING COMPOUNDS AND METHODS OF FORMING AND USING THE SAME

TECHNICAL FIELD

The present disclosure relates to fiber-reinforced molding compounds and methods of forming and using the same, for example, for use in extruders and molding systems.

BACKGROUND

Fiber-reinforced composites generally include two primary components: a polymeric material and a reinforcing material. The polymeric material may be a neat resin, a mixture, a blend, a compound or combination thereof. The polymeric material may include additives, fillers, stabilizers, pigments and/or other constituents. The reinforcing material may be a fiber. Typically, the polymeric material and the reinforcing material have different properties, such that when they are combined a composite material having intermediate properties is formed. For example, the polymeric material may be relatively low strength but may have relatively high elongation properties, while the reinforcing material may be very strong but relatively brittle. A composite plastic part derived from a composite material may have a strength that is greater than the polymeric material strength while also being relatively tough compared to the reinforcing material.

Injection molding is one of the most widely used processes for producing composite plastic parts. One common injection molding process utilizes pellets in finite lengths, which are prepared in advance and dispensed into an injection molding machine. Such pellets may be composite materials that include pre-impregnated fibers where a resin substantially wets out or impregnates each individual fiber also referred to herein as a filament. Alternatively, such pellets may include constituents of a composite material dosed together in the form of wire coated pellets where the resin encapsulates the outside of a mass of reinforcing fibers without substantial impregnation or wet-out, thereby requiring significant mixing within an extruder to achieve substantial wet-out and impregnation. Short fiber pellets include fibers randomly blended into a polymeric material (e.g., resin). Long fiber pellets may include unidirectional fibers. The length of the pellets may typically be limited to one (1) inch or less due to difficulties conveying and dispensing pellets of greater lengths. The pellets are fed into an extruder of an injection molding machine. At the same time, other types of pellets can be fed into the injection molding machine to introduce relevant functionalization to the resulting composite material. Other types of pellets include neat resin pellets, e.g., pellets that only include main identified polymers and optionally small fractional quantities of stabilizers and/or additives, and resin-containing pellets combined with additives and/or fillers. The pellets are introduced into the extruder in a cold, solid state to prevent the pellets from sticking to each other and/or blocking the feed into the extruder. After dispensing pellets into the extruder, the pellets are subjected to considerable shear by the extruder to heat and melt the resin as the pellets are also blended and homogenized into a uniform compound for forming (e.g., molding or extrusion). The shear, solid-melt interface and/or frictional forces during this process (plastification) reduces fiber length significantly.

An alternative form of injection molding includes an in-line compounding method where dry tows of glass reinforcing fibers (e.g., not wetted by any polymers, other than potentially a sizing) are exposed to resin and/or introduced into a melt stream of resin requiring significant mixing within an extruder to achieve substantial wet-out and impregnation. In this process, the fiber is dispersed within and wet-out by the resin and cut if necessary followed by blending, mixing and/or homogenization into a compound of uniform density for injection into a mold to produce injection molded parts.

Compression molding is another process used to produce plastic parts where a molding compound is placed in an open temperature-controlled mold cavity avoiding the runner system typically required by injection molding and reducing the shear exposure of the fibers. The mold is closed and pressure is applied to force the molding compound into all areas of the mold cavity. During this step, temperature and pressure are maintained to cure a thermoset molding compound or solidify a thermoplastic molding compound. Compression molding can be used to mold intricate and high-strength fiber reinforced parts. Materials that comprise the molding compound can be loaded into the mold either in the form of thermoplastic flakes (which must be melted within and subsequently cooled by the mold), an extrudate of bulk thermoset or thermoplastic molding compound, sheets of thermoset or thermoplastic molding compound, or combinations of formats.

An alternative form of compression molding includes an inline compounding option known in the industry known as LFT-D (Long Fiber Thermoplastic-Direct). Again, the composite plastic molding compound in the form of an extrudate is produced in-line in which dry tows of glass reinforcing fibers are exposed to resin and/or introduced into a melt stream of resin requiring significant mixing within an extruder to achieve substantial wet-out and impregnation. The fiber is dispersed within and wet-out by the resin and cut if necessary by blending, mixing and/or homogenization into a uniform compound for molding. In LFT-D, the molten compound is introduced directly into the compression mold.

Various extrusion processes are also utilized to directly produce plastic parts. Such processes can be used to extrude a shaped product from a molding compound. Extrusion is used to create parts with a fixed cross-sectional profile. A composite or polymeric material in pellet form is fed into an extruder that heats and softens the composite or polymeric material. The molding compound is pushed out via a die, possibly into cool water that solidifies the extruded product. Extrusion can be utilized to create very complex cross-sections having excellent surface finishes.

Blow molding is another process used to produce plastic parts. Blow molding is used to manufacture hollow plastic parts. The blow molding process typically begins with preparing a molding compound from pellets and forming it into a parison. The parison is a tube-like piece of molten material with a hole in one end through which compressed air can pass. The parison is then clamped into a mold and air is blown into it. The air pressure then pushes the molten material out to match the mold. Once the molten material has cooled and hardened the mold opens and the plastic part is ejected.

SUMMARY

In one embodiment, a method of forming a fiber-reinforced molding compound is disclosed. The method includes establishing a melt stream of a source material including a first polymeric material and dosing a composite material into the melt stream. The composite material includes pre-impregnated reinforcing fibers and a second polymeric material. The method further includes forming a molding compound from the source and composite materials and dispensing the molding compound from the extruder. The first and second polymeric materials are different than each other to introduce a functionality into the molding compound that is not present in the second polymeric material. The method further includes using the molding compound to produce a part.

In an embodiment, the source material includes a first resin having a first molecular weight and a first viscosity and the composite material includes a second resin having a second molecular weight and second viscosity. The first molecular weight may be greater than the second molecular weight or the first viscosity may be greater than the second viscosity. The first and second resins may be in the same resin family.

The source material may include a first resin and an additive, filler and/or nanoparticle abrasive to dry reinforcing fibers. The source material may include a first resin having a first viscosity and an additive, filler and/or nanoparticle affecting the first viscosity. The source material may include a first resin and an additive, filler and/or nanoparticle such that a viscosity of the first polymeric material is greater than a viscosity of the second polymeric material. The source material may include a first resin and the composite material may include a second resin where the first and second resins are from different resin families.

In an embodiment, the dosing step may include lubricating the composite material with the melt stream of the source material. The dosing step may include dosing the composite material in a solid form into the melt stream and the melt stream at least partially melting the composite material.

The composite material may be in the form of one or more continuous strands. Alternatively, the composite material may be in the form of a pellet or flake, and in such case, the dosing step may be carried out using a side feeder. The reinforcing fibers may include carbon fiber, glass fiber, synthetic fiber, natural fiber or combinations thereof. The method may further include heating the composite material before the dosing step. Each of the first and second polymeric materials may include a thermoplastic or a thermoset polymeric material.

DETAILED DESCRIPTION

Figure 1:
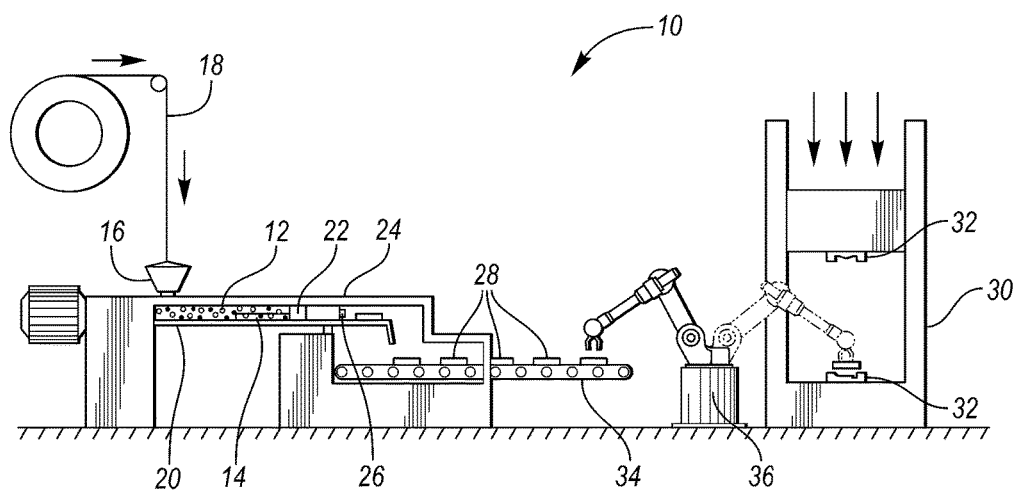
FIG. 1 depicts a schematic of an extrusion system for compression molding according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "about" may be used herein to describe disclosed or claimed embodiments. The term "about" may modify a value disclosed or claimed in the present disclosure. In such instances, "about" may signify that the value it modifies is within ±0%, 0.1%, 0.5%, 1%, 2%, 3%, 4%, 5% or 10% of the value.

As described above, during the compounding of a fiber-reinforced material, the fibers may be subject to shearing and mixing actions. For example, when pre-formed pellets are used, the solid-melt interface during plastification reduces fiber length significantly. Pellets that have not yet been melted (e.g., still solid) may come into contact with fibers in the melt, which may cause damage to and/or breakage of the fibers. This breakage may reduce the length of the fibers in the melt and, ultimately, the final product. In general, the length of the fibers in the final product may positively correspond to the quality or the properties of the final product. For example, if a high strength (e.g., tensile strength) fiber is included in a composite material, the overall strength of the final product is typically higher the greater the retained length of the included fibers.

While fiber damage and fiber length may be important factors for all reinforcing fibers, some types of fibers are more robust than others. Carbon fibers, while being strong and stiff, are also generally quite fragile compared to, for example, glass fibers. Carbon fibers may therefore be particularly susceptible to damage by shear from mixing, friction between the dry fibers and/or the solid-melt interface for pellet compounding. When introducing dry tows or tows encapsulated in resin with insignificant impregnation or wet-out into a melt stream, such as during in-line compounding for injection or compression molding, friction between the dry fibers as well as the work required to disperse and wet-out carbon fibers within the melt stream often results in severe damage to the carbon fibers and severe reduction in fiber length. As described above, this damage and breakage may severely reduce the mechanical performance of the molded parts. In addition, the fiber on fiber friction as well as heating by friction at higher fiber concentrations can thermally degrade the resin or prematurely initiate cure (thermoset resins). Carbon fiber tows without any pre-impregnation demonstrate significant fiber damage as low as 10% volume fraction ($V_f$). When volume fraction is increased from 20% to 30%, tensile strength decreased. It has been demonstrated that above 40% volume fraction is not sustainable due to uncontrolled heat generation due to friction causing resin degradation.

Accordingly, materials, systems, and methods for reducing the damage to reinforcing fibers are still needed. In particular, approaches that reduce the damage to carbon fiber and allow for longer fiber lengths in the finished composite part would be beneficial. In one or more embodiments herein, several approaches that use pre-impregnated composite material including reinforcing fibers produced offline from the extrusion process and under precise and careful operating conditions are proposed that reduce fiber damage and increase fiber length, especially for carbon fiber. In one embodiment, a continuous strand of pre-impregnated composite material including reinforcing fibers may be used as a portion or all of the molding compound. In another embodiment, a pre-impregnated composite material having a very high area to thickness ratio may be used as a portion or all of the molding compound as a continuous tape or flake, for example. In still another embodiment, a pre-impregnated composite material may be introduced into an established melt stream. The melt stream can include one or more polymers, additives, fillers and/or other constituents. These approaches may further be combined to create additional processes having the benefits of each approach or synergistic benefits.

With reference to FIG. 1, a schematic of an extrusion system 10 for compression molding is shown. The system 10 may include an extruder 12, which may be a screw extruder. The extruder 12 may include a single screw 14 or it may be a twin-screw extruder. The extruder 12 may include an inlet port 16 for receiving a source material, e.g., a pre-impregnated continuous strand 18 in a rear end or portion 20 of the extruder 12. The screw(s) 14 may advance the pre-impregnated continuous strand 18 within the extruder and rotate, cut, mix, shear, and/or heat the composite material as it moves to prepare a molding compound 22 by the time the material reaches a front end or portion 24 of the extruder 12.

The front end 24 of the extruder 12 may include a die 26, which may define an opening therein. The molding compound 22 may be forced through the die 26 under pressure from the screw(s) 14. In the case of a compression molding system, such as shown in FIG. 1, die 26 may form the molding compound 22 into blanks 28. The blanks 28 may then be fed to a compression press 30 having a mold 32. The blanks 28 may be transported to the mold 32 in any suitable manner including direct extrusion into the mold or via injection from a shooting pot. The blanks 28 may be transported from the extruder 12 to the press 30 via a conveyor belt 34. The blanks 28 may then be loaded into the mold 32 using any suitable manner, for example, by a robot 36, as shown. The blanks 28 may be in a molten and pliable state when loaded into the mold 32, such that when the mold 32 is closed the blank 28 conforms to the cavity of the mold 32 and takes the shape of the mold cavity corresponding to a desired part shape. For thermoplastic molding compounds, the mold 32 may include cooling channels therein to accelerate the cooling of the part. After the part has been formed and cooled sufficiently to retain its shape, it may be ejected from the mold 32. For thermoset molding compounds, the mold 32 may include heating channels therein to accelerate a chemical cure of the material after which the part may be ejected in a rigid state from the mold.

Pre-impregnated continuous strand 18 may include a polymeric material and reinforcing fibers. The polymeric material may be a thermoplastic or thermoset polymeric material. The polymeric material can be tailored to the process for producing the pre-impregnated continuous strand 18. For example, higher melt flow, lower viscosity resins can be used to facilitate wet-out and impregnation of the fibers.

The fibers may be any suitable reinforcing material, such as carbon fiber, glass fiber, synthetic fibers (e.g., aramid or ultra-high-molecular-weight polyethylene (UHMWPE)), natural fibers, or any combination thereof. The form-factor of the fibers, such as size and number, may depend on the fiber type. For example, carbon fibers may generally be bundled into a fiber tow, which may include thousands of individual carbon filaments (e.g., 1 k, 3 k, 6 k, 12 k, 24 k, 50 k or other sizes where "k" represents 1000).

Figure 2A:
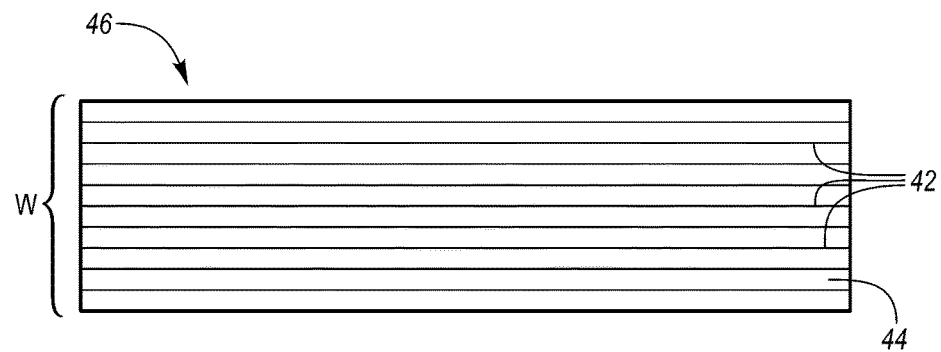
FIG. 2A depicts a top view a continuous strand tape material according to an embodiment.
Figure 2B:
FIG. 2B depicts a side view the continuous strand tape material shown in FIG. 2A.

Pre-impregnated continuous strand 18 can be in the format of a tape or cord (e.g., with a circular or elliptical cross-section). As shown in FIGS. 2A and 2B, a pre-impregnated continuous tape 46 that includes continuous fibers 42 within a polymeric material 44. As used herein, continuous fibers may be those that are unbroken throughout a length or width of pre-impregnated continuous tape 46. The fibers 42 may be arranged in substantially a single direction, which may be parallel to the length of the pre-impregnated continuous tape 46 (e.g., as shown in FIG. 2A). In other embodiments, the fibers may be of finite length or a combination of finite length and continuous fibers. The length of the pre-impregnated continuous tape 46 may be any one of the following values or within a range of any two of the following values: 0.01, 0.1, 1, 2, 3, 4, 5, 10, 50 or 100 kilometers. Large lengths of pre-impregnated continuous strand may be collected on a roll or spool. A portion of an unrolled pre-impregnated continuous tape 46 is shown in a top view in FIG. 2A and in a side view in FIG. 2B. The pre-impregnated continuous tape 46 may have a relatively large width (W) (FIG. 2A) and a relatively small thickness (T) (FIG. 2B). W may be any one of the following values or within a range of any two of the following values: 6, 60, 120, 180, 240, 300, 360, 420, 480, 540 and 600 millimeters. T may be any one of the following values or within a range of any two of the following values: 0.05, 0.1, 0.2, 0.3, 0.4, 0.5 and 1.0 millimeters.

In at least one embodiment, the fibers 42 in the pre-impregnated continuous tape 46 are substantially wet-out and impregnated by the polymeric material 44. As used herein, substantially wet-out and impregnated may describe a material in which each filament is significantly coated in a polymeric material or protected through isolation from other filaments by a polymeric material. Substantially wet-out and impregnated may mean that practically all of the filaments are significantly coated in or protected by the polymeric material and/or that each filament is significantly coated in or surrounded by the polymeric material.

Microscopy is a technique that may be useful for assessing wet-out and impregnation within a pre-impregnated composite material, e.g. continuous strand. Both optical and electron microscopy can be applied to identify and count the individual filaments within a specimen that are protected by polymeric material, e.g., resin from possible direct contact with other filaments during subsequent processing. The percentage of protected filaments from the total number of filaments can quantify the degree of wet-out and impregnation. For example, sample cross-sections can be prepared for each fiber axis present in a pre-impregnated composite material. Each sample cross-section can be viewed at sufficient magnification to identify individual filament ends. A filament may be considered protected if a polymeric material surrounds the filament completely forming a barrier between it and an adjacent filament. Point contact with other filaments is permitted provided the polymeric material is present elsewhere on the circumference of the filament. Voids in contact with the filament are permitted provided the polymeric material completely encapsulates the filament and voids. Voids not adjacent to filaments but dispersed within the polymeric material have no effect on the measurement. Data of a statistically significant sample size is collected and analyzed to arrive at percentage of wet-out and impregnated filaments versus total filaments.

Poor wet-out, such as exposing fiber tows to resin for dosing purposes without effort to properly condition and spread the tows and carefully work the polymeric material into the bundles of fibers before entering the extruder, results in increased friction between the fibers during mixing within the extruder and may require a screw design that imparts more work (shear) into the melt stream to open the remaining bundles of fiber and achieve wet-out and impregnation. The results are poor retention of fiber length in the molding compound, typically below 2 mm in average fiber length for carbon fibers but more often below 1 mm in average fiber length. Pre-impregnated composite material, e.g., continuous strand, produced offline (e.g., not within an extruder) where the proper conditioning and manipulation of the tows during impregnation under tension may provide for a substantially wet-out and impregnated strand where the number of wet-out and impregnated filaments versus total filaments is greater than 30%, 50%, 75%, 95% or 98%. Higher levels of pre-impregnation result in improved performance for the molded part through retention of fiber length during processing.

Accomplishing substantial wet-out may require accurate control of multiple parameters when creating a pre-impregnated composite material. Certain composite materials may require greater levels of control than others. For example, substantial impregnation or wet-out of carbon fiber is typically much more difficult to achieve than most other fiber types, such as glass fibers, due to its physical properties and smaller filament diameter. For example, E-glass fibers commonly used as continuous rovings for certain inline compounding processes may exhibit a filament diameter of 14 to 24 microns and an elongation of close to 4.5% to 4.9% before failure; however, carbon fiber typically exhibits a filament diameter closer to 5 to 10 microns and an elongation of under 0.7% for higher modulus fibers to approximately 2.2% for high strength fibers even though stiffness and strength of carbon fiber is far superior to glass fibers. Substantial wet-out of carbon fiber may require precise and careful control of the fiber tension, spreading of the tows to release the individual filaments from contact with each other and increase surface area, drying the fibers to remove moisture within the sizing (chemical surface treatment), pre-heating of the fibers close to or above the melting point of the polymeric material, precise application of the resin to the fibers, and careful and repeated manipulation of the fiber that minimizes bending and transverse shear or extended periods under heat and pressure while wet-out and impregnation of each filament is carried out. This precision and careful control cannot be achieved within the simplicity of a roller nip of a pair of nip rollers, nor through drawing carbon fiber tows through a channel or die in contact with resin where filaments can break and accumulate and obstruct the drawing of carbon fiber tows through the channel or die.

In addition to the relative difficulty of substantially wetting the fibers, particularly carbon fibers, of a composite material, direct compounding of composite materials also has challenges. One such challenge, especially for carbon fiber, is throughput. Substantial fiber impregnation or wet-out may require a high level of control, as described above. Accordingly, the rate at which the pre-impregnated continuous strand can be generated may be limited in a direct compounding system. In one example, if 50 carbon fiber tows having 24 k filaments each at 1,000 tex (grams per 1,000 meters) are impregnated at 10 meters per minute, about 60 kg of pre-impregnated continuous strand may be produced. However, a typical molding or extrusion process may require a much greater quantity of source material, for example, an order of magnitude greater or more.

Accordingly, in at least one embodiment, the pre-impregnated continuous strand 18 may be completely produced prior to the extrusion process (e.g., an offline process). The pre-impregnated continuous strand 18 may be a completely solid input or starting material, and may be formed as a roll or spool. The formation of the pre-impregnated continuous strand may therefore be completely decoupled from the extrusion process. This may allow each process to be carried out using its own operating conditions, which may be optimized for each process. It may also allow larger quantities of the pre-impregnated continuous strand to be generated and supplied to the extruder than could be directly compounded in situ.

In one embodiment, the pre-impregnated continuous strand (e.g., a tape formed offline) may comprise the entire source material for an extrusion process, such as a process performed by system 10. Accordingly, the composition of the pre-impregnated continuous strand may be the same or very similar to the target composition of the final molded part.

In embodiments where the pre-impregnated continuous strand (e.g., tape) is not the entire source material, additional constituents may be added to the extruder and compounded with the pre-impregnated continuous strand (e.g., tape). The additional constituents may include polymers/resins (e.g., neat), additives such as UV or heat stabilizers or compatibilizers, fillers, blowing agents, coloring agents, or other constituents. If one or more additional polymers or resins are added to the pre-impregnated continuous strand (e.g., tape), they may be the same type of polymer or resin as used in the pre-impregnated continuous strand or they may be different (or a combination of both, if multiple polymers are added).

If the added polymeric material is the same as the pre-impregnated continuous strand, then providing additional polymeric material may effectively cut-down or dilute the fiber concentration of the melt stream. Accordingly, the pre-impregnated continuous strand (e.g., tape) may be formed with a fiber concentration that is higher than the desired target concentration in the molded part and then blended in the extruder with a neat polymer of the same composition to reduce the fiber concentration to the target concentration. If the added polymeric material is different than the pre-impregnated continuous strand, then a polymer blend or alloy may be formed during extrusion. This may allow the properties of the polymer(s) in the formed part to be adjusted or varied compared to the polymeric material used in the pre-impregnated continuous strand.

It has been discovered that impregnating and wetting the fibers of the pre-impregnated continuous strand (e.g., tape) may protect the fibers during the extrusion process. As described above, the extrusion process includes shearing and mixing actions that may damage the fibers in the source material, particularly more fragile fibers like carbon fibers. This damage may reduce the mechanical properties of the composite material and/or cause the fibers to be broken or cut into smaller lengths (which also reduces the mechanical properties). However, it has been found that substantially impregnated and wet-out fibers are better protected from such damage during the extrusion process. Since the filaments are in full contact with the polymeric material, there is less risk that the fibers will be directly contacted and damaged.

This improved protection may allow for the use of additives, fillers, or other constituents that would typically damage the fibers or inhibit impregnation. For example, some polymers may cause more damage than others to the fibers during impregnation. While composite materials are typically produced with a lower molecular weight resin that provides low viscosity or higher melt flow to facilitate better wet-out and impregnation, the strength of such resins is lower than their higher molecular weight counterparts. Moreover, mineral fillers that reduce cost and/or enhance surface appearance may be abrasive to the fibers causing significant damage. Pigments such as titanium dioxide (e.g., white) are particularly abrasive. In one embodiment, the pre-impregnated continuous strand may include a polymeric material that is less harsh on the fibers (e.g., based on the factors above) and/or that easily wets out and impregnates the fibers (may depend on fiber type). The pre-impregnated continuous strand may then be combined with a polymeric material or constituents in the extruder that are harsher on the fibers than the polymeric material used to impregnate and wet-out the continuous strand. The fully impregnated fibers may then be protected from these harsher materials and the damage to the fibers may be mitigated or eliminated and the final fiber length of the molded part may be increased.

As described above, the pre-impregnated continuous strand and the protection of the fibers provided thereby may allow for longer fiber lengths in the extrusion process. In at least one embodiment, the average final fiber length (e.g., the length of the fibers in the extruded/molded product) may be at least 2 millimeters for carbon fibers. In another embodiment, the average final fiber length may be at least 5, 10, 15, or 20 millimeters for other fiber types. In another embodiment, the average final fiber length may be at least 0.25 inches, 0.5 inches, or 0.75 inch for other fiber types. In comparison, average fiber lengths for processes using pre-impregnated pellets or direct compounding (e.g., in-line within an extruder) with dry carbon tows or poorly wet-out and impregnated tows are typically less than 2 millimeters for carbon fiber and often less than 1 millimeters.

Figure 3:
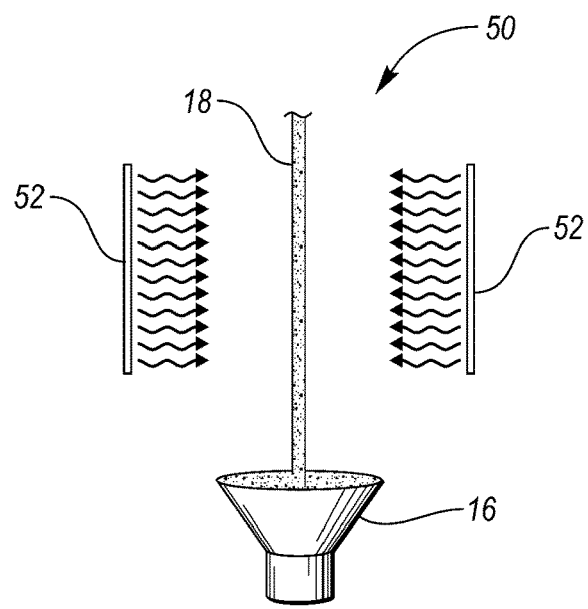
FIG. 3 depicts a schematic of a heating system according to one embodiment.

With reference to FIG. 3, a heating system 50 may be included in the extrusion system 10. The heating system 50 may include one or more heaters or heating elements 52. The heating elements 52 may be any suitable heating equipment or device, such as hot air heaters, flame heaters, infrared (IR) heaters, conduction heaters, induction heaters, lasers, or others, as well as combinations thereof. The heating elements 52 may be positioned proximate the inlet port 16 such that they are configured to heat the pre-impregnated continuous strand 18 prior to it entering the inlet port 16 (e.g., directly before entering the port). In at least one embodiment, the pre-impregnated continuous strand 18 may be the pre-impregnated continuous tape 46. The heating system 50 may be configured to heat the source material such that it is softened, but still solid (e.g., below the melting temperature of the polymeric material). This may reduce the amount of extra heat/energy that must be added by the extruder to melt the polymeric material. In another embodiment, the heating system 50 may be configured to heat the source material to at or above the melting temperature of the polymeric material, such that it is at least partially or completely melted. This may even further reduce the energy needed to be added by the extruder and may facilitate the extrusion process. Softening or melting the source material also eliminates or minimizes the solid-melt interface where unmelted source material damages fiber during contact within the melt stream. A tape or flake format further protects fiber damage by the compliance inherent in its form factor and facilitates heat transfer.

Figure 4:
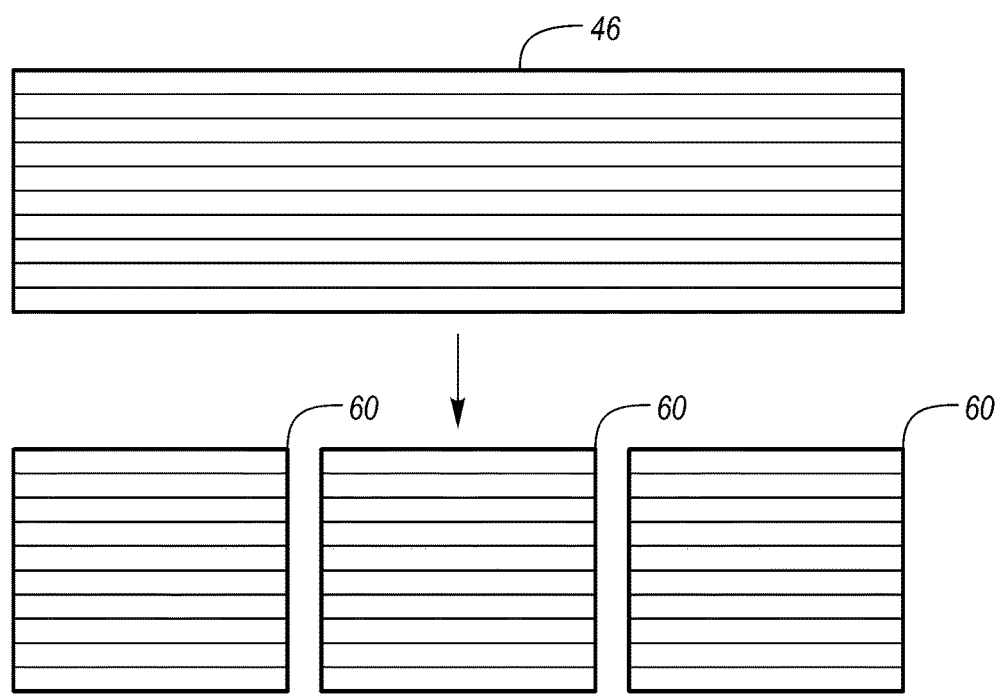
FIG. 4 depicts a top view of a pre-impregnated strand divided into pre-impregnated flakes.
Figure 5:
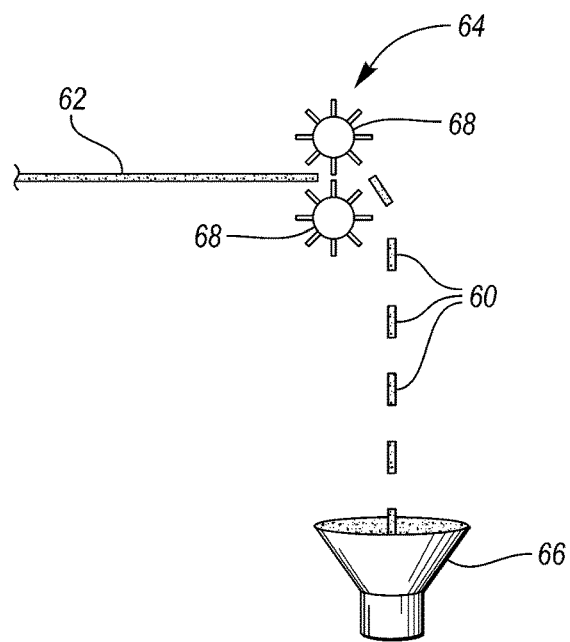
FIG. 5 depicts a schematic of a cutting device for dividing a pre-impregnated strand of a tape format into pre-impregnated flakes.

With reference to FIGS. 4 and 5, in at least one embodiment the pre-impregnated continuous strand may be formed as flakes 60. In one embodiment, the flakes 60 may be formed by cutting, shredding, chopping, or otherwise dividing the pre-impregnated continuous tape 46 into a plurality of defined segments. The introduction of flakes into the extruder provides for greater control over initial fiber length versus cutting dry tows or pre-impregnated continuous strand within an extruder where stretching and shearing of the fiber within the tows or pre-impregnated continuous strand may result in damage to the fibers and an uncontrolled distribution of fiber lengths. The pre-impregnated continuous tape 46 may be cut in a direction perpendicular to its long axis to form a plurality of rectangular flakes 60 (provided the tape 46 is rectangular). In one embodiment, the flakes 60 may be cut such that the fibers therein are all substantially the same length (e.g., as shown in FIG. 4). In another embodiment, the flakes 60 may be cut such that there are varying fiber lengths within the flake 60. For example, the cuts may be made in an alternating perpendicular and oblique pattern such that one side of the flake is perpendicular to the long axis of the tape and the other is on an angle, thereby creating a variable fiber length across the width of the flake. In one embodiment, the perpendicular cuts can be used to generate same length inputs of one starting length into the extruder. In another embodiment, the perpendicular cuts can be used to generate multiple length inputs of those specific sizes based on the relative proportion of each cut. In an alternative embodiment, the source material can be cut at an angle to provide a continuous distribution of fiber lengths between a minimum and maximum flake length.

Figure 6A:
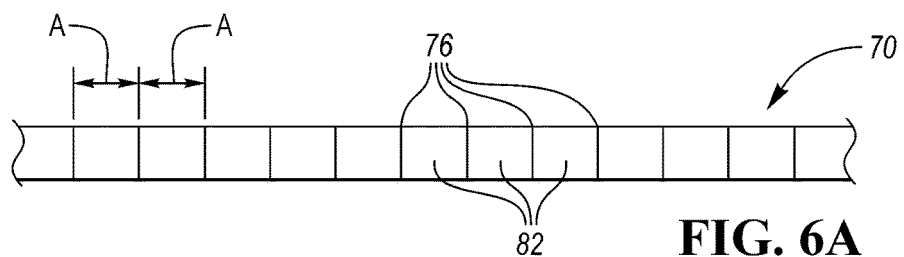
FIGS. 6A, 6B and 6C depict schematics of different schemes for dividing pre-impregnated strand of a tape format into flakes.
Figure 6B:
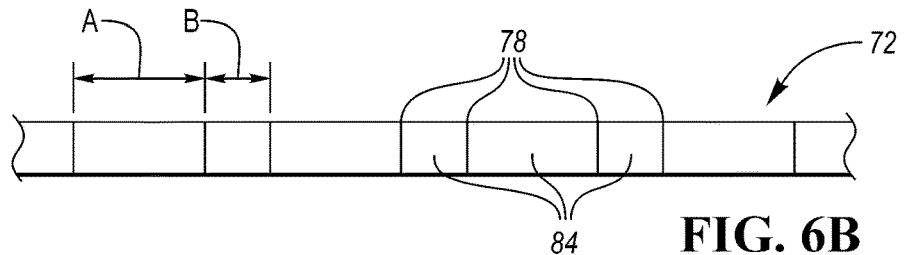
Figure 6C:
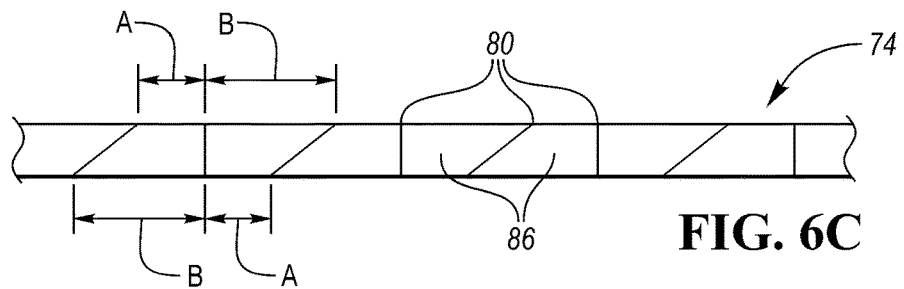

FIGS. 6A, 6B and 6C depict further examples of pre-impregnated continuous tape 70, 72, 74, respectively, divided into pre-impregnated flakes having a predetermined distribution of fiber lengths. Pre-impregnated continuous tape 70, 72, 74 each include continuous reinforcement fibers. These reinforcement fibers are divided according the dividing lines 76, 78, 80 shown on pre-impregnated continuous tape 70, 72, 74, respectively. In FIG. 6A, pre-impregnated continuous tape 70 is divided into flakes 82 by dividing lines 76, and each flake has an equal length A. In FIG. 6B, pre-impregnated continuous tape 72 is divided into flakes 84 by dividing lines 78, and each flake has either length A or length B. In one example, length A can be 5 millimeters and length B can be 10 millimeters. The dividing scheme identified in FIG. 6B can be used to generate a uniform distribution of flakes having half of the flakes with length A and half of the flakes length B. This dividing scheme could be used to divide the flakes into three or more different predetermined lengths in a predetermined pattern to generate a uniform or non-uniform distribution of the three or more different predetermine lengths. In FIG. 6C, pre-impregnated continuous tape 74 is divided into flakes 86 by dividing lines 80. Each flake is a quadrilateral having a side with a length A and an opposing side with a length B. These flakes deliver a uniform distribution of fibers ranging from length A to length B. In one example, length A can be 5 millimeters and length B can be 10 millimeters.

As used herein, the term flake may refer to a shape having a relatively consistent length and width and a thickness that is small relative to the length and width. If the flakes 60 are formed from a tape, such as tape 46, then the flakes will have the same thickness and width as the tape, but will have a finite length. The flakes 60 may have continuous fibers disposed therein, similar to the tape 46. The fibers may extend unbroken from one side of the flake to the other or may have other patterns, similar to those described above for the tape 46.

With reference to FIG. 5, the flakes 60 may be formed immediately prior to being introduced into an extruder. A continuous source material 62 may be fed through a cutting device 64 to cut, shred or otherwise divide the continuous source material 62 into a plurality of discrete flakes 60. The flakes 60 may then fall by gravity into an inlet port 66 and be fed to the extruder for melting and processing. The continuous source material 62 may be a tape, such as tape 46 described above. The continuous source material 62 may be fed to the cutting device 64 using any suitable means, such as rollers or a conveyor belt. The cutting device 64 may include any suitable cutting element or elements 68, such as cutting rollers, chopping blades, lasers, etc. In one embodiment, a heating system, such as the one shown and described with respect to FIG. 3, may be included and configured to heat the flakes 60 as they fall to the inlet port 66.

In another embodiment, the flakes 60 may be generated and collected prior to introduction into the extruder. For example, instead of falling into an inlet port 66 in FIG. 5, the flakes 60 may fall into a collector, such as a bin or container. The flakes 60 may then be stored in bulk until an extruding and molding operation is to be performed. When the flakes are needed, they may be fed into the extruder in a manner similar to how conventional pellets are introduced, such as via a hopper.

In certain applications, flakes may melt faster than pellets, especially when introduced into an existing melt stream due to their large surface area and small thickness. Also, flakes are not rigid like pellets and can more easily conform without breaking when subjected to shear prior to completely being melted.

Figure 7:
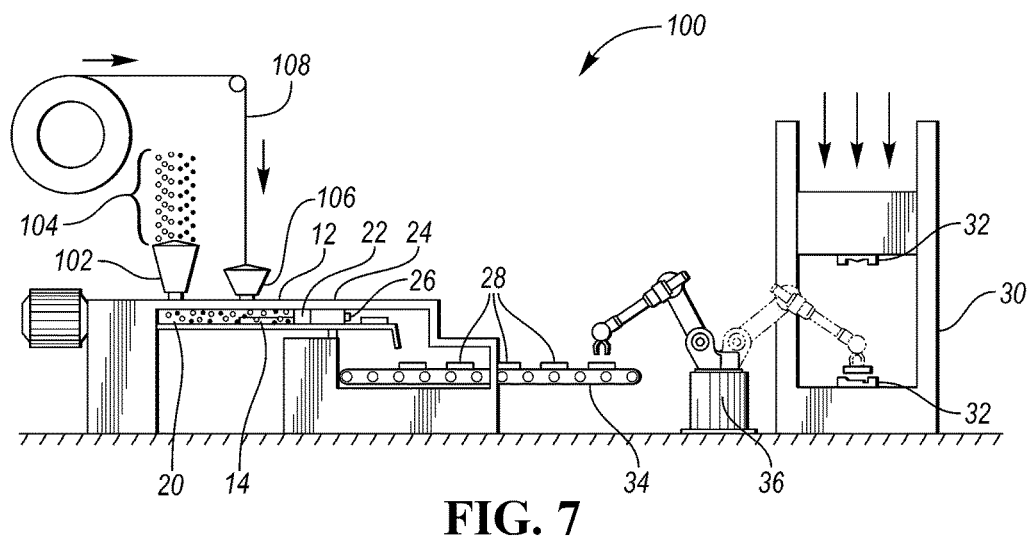
FIG. 7 depicts a schematic of an extrusion system for compression molding according to one embodiment.

With reference to FIG. 7, a schematic of an extrusion system 100 for compression molding is shown. The system 100 may be similar to system 10, with similar components sharing the same numerals. Differences in the two systems are described below. The system 100 may include an extruder 12. The extruder 12 may include an inlet port 102 for receiving one or more source materials 104 in a rear end or portion 20 of the extruder 12. The screw(s) 14 may advance the source material 102 within the extruder and rotate, mix, shear, and/or heat the material as it moves to form a melt stream 22 by the time the material reaches a front end or portion 24 of the extruder 12.

In at least one embodiment, the source material(s) 104 may include at least one polymeric materials. The polymeric materials may be formed as pellets, particles, or any other form factor known in the art. The polymeric materials may be fed into an inlet port 102 from a hopper. In one embodiment, the polymeric materials fed into the inlet port 102 may be neat resins having no reinforcing fibers therein. In such cases, the fiber concentration of the polymeric material is zero (0). The polymeric materials may include additives, such as fillers, blowing agents, coloring agents, and/or other constituents. The polymeric material or constituents may therefore be introduced near the rear of the extruder and may begin mixing and shearing as they are transported towards the front end.

The extruder 12 may include a second inlet port 106, which may be proximate the inlet port 102 or may be downstream from the inlet port 102 (towards the front of the extruder). In at least one embodiment, the second inlet port 106 may be downstream of the inlet port 102, such as shown in FIG. 6. In these embodiments, the source material(s) 104 may be at least partially melted by the time they reach the region of the extruder where the second inlet port 106 is located. Alternatively, such compounding of the polymeric materials with other constituents may be done within a separate extruder and introduced as a melt stream into a second extruder into which the fiber-reinforced source material is introduced. In one embodiment, the source material(s) 104 may be completely melted when they reach the region of the second inlet port 106.

A fiber-reinforced source material 108 may be introduced into the extruder 12 through the second inlet port 106. As described above, the second inlet port 106 may be located at a region on the extruder where the source material(s) 104 are partially or completely melted. Accordingly, the fiber-reinforced source material 108 may be introduced into an existing melt stream. In one embodiment, the fiber-reinforced source material 108 is a pre-impregnated fiber source material, such as any of those described herein. For example, the pre-impregnated source material may be a continuous pre-impregnated source material, such as a tape (e.g., tape 46), or it may be a flaked pre-impregnated source material, such as flakes 60. These pre-impregnated source materials may be substantially impregnated or wet out. However, other fiber-reinforced materials may also be used as the fiber-reinforced source material 108, such as pellets.

The fiber-reinforced source material 108 may include the fiber type(s) and/or polymeric materials described above for the pre-impregnated continuous strand 18. For example, the fiber-reinforced source material 108 may include fibers such as carbon fiber, glass fiber, aramid fibers, or others, or a combination thereof. The fiber-reinforced source material 108 may include thermoplastic or thermoset polymeric materials as the matrix material.

In one embodiment, the matrix material of the fiber-reinforced source material 108 may be the same as at least one of the source materials 104. Accordingly, if the source material 104 is a neat polymer (no fibers) or has a fiber concentration below the fiber-reinforced source material 108, the downstream introduction of the fiber-reinforced source material 108 may create a fiber-reinforced material having an intermediate fiber concentration between the source material 104 and the fiber-reinforced source material 108. The source material 104 may therefore be used to cut-down or reduce the fiber concentration of the final melt stream and molded part.

In another embodiment, the matrix material of the fiber-reinforced source material 108 may be different from at least one of the source materials 104, or from all of the source materials 104. Accordingly, the introduction of the fiber-reinforced source material 108 may generate a polymer blend or alloy with the source material 104. The composition of the blend will depend on the relative amounts of the source material 104 and the fiber-reinforced source material 108. Similar to above, if the source material 104 is a neat polymer (no fibers) or has a fiber concentration below the fiber-reinforced source material 108, the downstream introduction of the fiber-reinforced source material 108 may create a fiber-reinforced material having an intermediate fiber concentration between the source material 104 and the fiber-reinforced source material 108. Fiber-reinforced source material 108 have fibers already coated with a resin, thereby protecting them from the upstream melt stream produced by material 104, which may have a different matrix resin or composition that is not compatible with the impregnation process due to a higher viscosity, abrasive fillers, etc.

Figure 8:
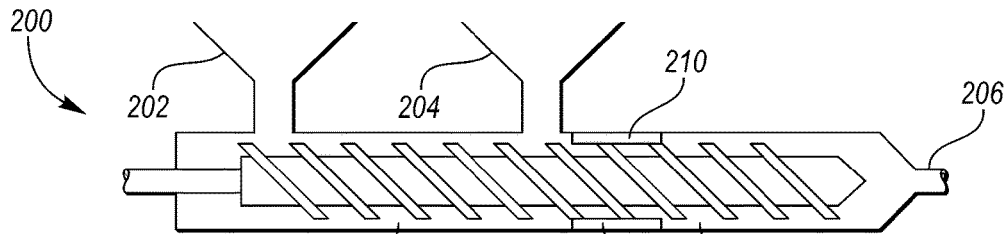
FIG. 8 depicts an extrusion system according to an embodiment.

FIG. 8 depicts an extrusion system 200 according to an embodiment of the present disclosure. Extrusion system 200 includes an upstream port 202, a downstream port 204, and an exit port 206. A source material can be dosed (e.g., using a gravimetric feeding process) into the upstream port 202. The source material can be supplied as solid pellets or pellets having unidirectional fibers either pre-impregnated with resin or wire coated around the circumference of a core of fibers so that the initial length of the fiber is fixed by the length of the pellets. These pellets can be dosed with other pellets made from neat resin or compounds that include additives, fillers, blowing agents or other functionalization required by the process or part. Each pellet type is dosed in a controlled manner into the upstream port 202 and undergoes significant shear as the pellets are combined, conveyed, heated, and blended or mixed into a melt stream within melt stream region 205, which extends between upstream port 202 and downstream port 204.

In one embodiment, a composite material is dosed into downstream port 204 after the melt stream has been established from the source material of upstream port 202. The composite material of downstream port 204 can be reinforcing fibers pre-impregnated by a matrix material. The composite material can be dosed as pellets, tape or flake, for example. In one embodiment, the fiber concentration of the composite material can be higher than the fiber concentration of the molding compound and the source material. By dosing the composite material into the melt stream, a more rapid melting of the composite material can be achieved than conventional processes. This melting occurs in the compounding region 208, which is situated between the downstream port 204 and the exit port 206. The compounding region 208 may include a cutting zone 210, which can divide a composite material dosed as a strand containing continuous fiber. In addition to the rapid heating of the composite material, the melt stream helps lubricate the composite material as it combines with the melt stream, thereby minimizing shear to the composite material as it is melted. The rapid heating in combination with the melting of the composite material combined with a reduction in shear during the heating phase facilitates the retention of fiber length in the melt stream from which a part will be produced. The molding compound exits extrusion system 200 at exit port 206 appropriately configured for the intended process and can be used to produce a composite part using any suitable molding process, e.g., compression molding, extrusion, injection molding or blow molding.

In most cases, the source material of upstream port 202 and the composite material of downstream port 204 can each include one or more resins. In one example, a resin of the same family used to produce the composite material can be used in the source material. Non-limiting examples of resin families include polypropylene, polyamide, and polyethylene terephthalate. The resin in the source material can have a higher molecular weight or viscosity, which would be otherwise unsuitable for initial impregnation of the fibers of the composite material, but enhances the toughness or processability of the molding compound exiting the extrusion system 200 at exit port 206. In another example, the source material can include a polymeric material that included a resin of the same family used to produce the composite material, but which also includes additives, fillers and/or microparticles that may be abrasive to dry fibers, raise the viscosity above what is feasible to support fiber impregnation, or exhibit some other incompatibility with the fiber impregnation process. However, by using such resin or polymeric material only in the melt stream and then combining it with the composite material, the resulting molding compound may have reduced density, enhanced mechanical or physical properties, reduced cost, improved flowability and/or other attributes relevant to the final part production. In yet another example, the source material can include a different resin that is not in the same family as the one used in the composite material to create a blend or alloy with enhanced properties and performance relative to the final part application. The resin in the source material can be used to dilute the fiber concentration of the composite material.

Figure 9A:
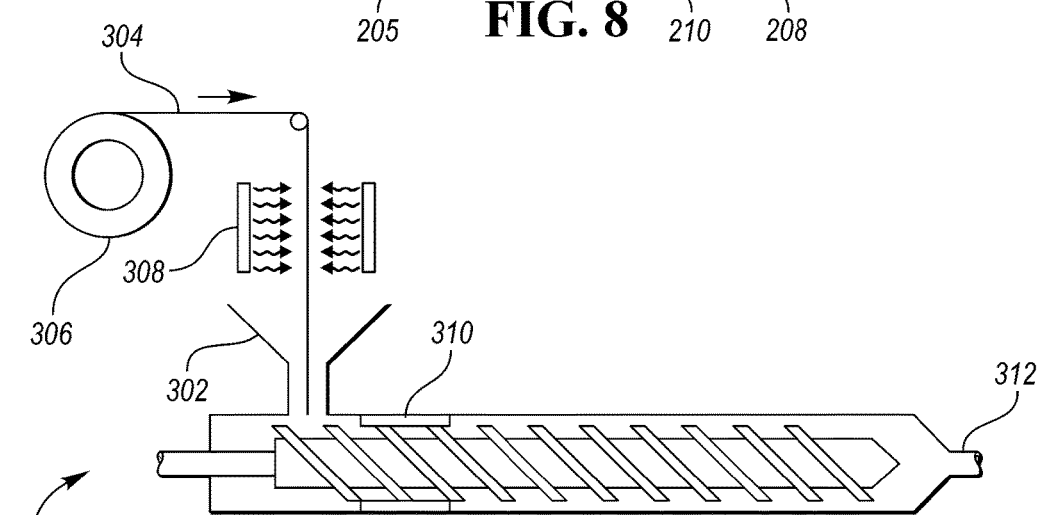
FIG. 9A depicts an extrusion system according to another embodiment.
Figure 9B:
FIGS. 9B, 9C, 9D and 9E depict examples of cross-sections of a pre-impregnated continuous strand.
Figure 9C:
Figure 9D:
Figure 9E:

FIG. 9A depicts an extrusion system 300 according to another embodiment of the present disclosure. Extrusion system 300 includes input port 302 and exit port 312. In one embodiment, a pre-impregnated continuous strand of composite material 304 in any form disclosed herein, including a pre-impregnated continuous tape, is dosed into port 302. The pre-impregnated continuous strand may have a substantially uniform cross-section, e.g., not deviating more than ±0%, 0.1%, 0.5%, 1%, 2%, 3%, 4%, 5% or 10% of the cross-sectional area in any cross-section along the length of the continuous strand. Non-limiting examples of cross-sectional shapes include elliptical (FIG. 9B), oblong (FIG. 9C), rectangular (FIG. 9D), or tape (FIG. 9E). One more cross-sectional shaped pre-impregnated continuous strands may be introduced in input port 302 sequentially or at the same time to insure sufficient material throughput. For example, one 200 mm wide tape-shaped strand or 2 100 mm wide tape shaped strands or 10 circular shaped strands may be introduced into input port 302 at the same time to insure sufficient material throughput.

The composite material 304 can be delivered from a coil 306 of composite material. The composite material can contain continuous, discontinuous or a combination of fiber lengths depending on the application. The fiber concentration in the composite material can be about equal to the fiber concentration intended for the final part application. Optionally, the composite material 304 can be heated by heating device 308, which can use conduction, induction, convection, radiation (e.g., infrared), or a combination thereof. Extrusion system 300 can include a cutting zone 310 for dividing composite material 304 formed from strands containing continuous fiber. A melted compounding stream is formed within the extrusion system 300. The compounding stream exits extrusion system 300 at exit port 312 appropriately configured for the intended process and can be used to produce a composite part using any suitable molding process, e.g., compression molding, extrusion, injection molding or blow molding.

Composite material 304 can be a pre-impregnated continuous strand used as an intermediate material dosed to extrusion system 300. In one embodiment, the pre-impregnated continuous strand includes carbon fiber. The pre-impregnated continuous strand is produced offline of the extrusion system 300 to avoid potential drawbacks of in-line compounding of dry or poorly impregnated tows. For example, while processes that in-line compound dry or poorly impregnated tows of glass fibers with resin can retain fiber lengths of 20 millimeters or longer, the same processes when dry tows of carbon fibers are applied cannot retain 2 millimeters on average due to the brittleness and structure of the fiber. Retention of fiber length is critical to maximizing the value of the resulting molding compound. Accordingly, one embodiment of the present disclosure includes decoupling the impregnation of the fiber and to produce the pre-impregnated continuous strand separately under its own optimum process conditions and to subsequently take the pre-impregnated continuous strand and feed it at a much higher rate relevant to the process that converts the strand into a composite part.

Figure 10:
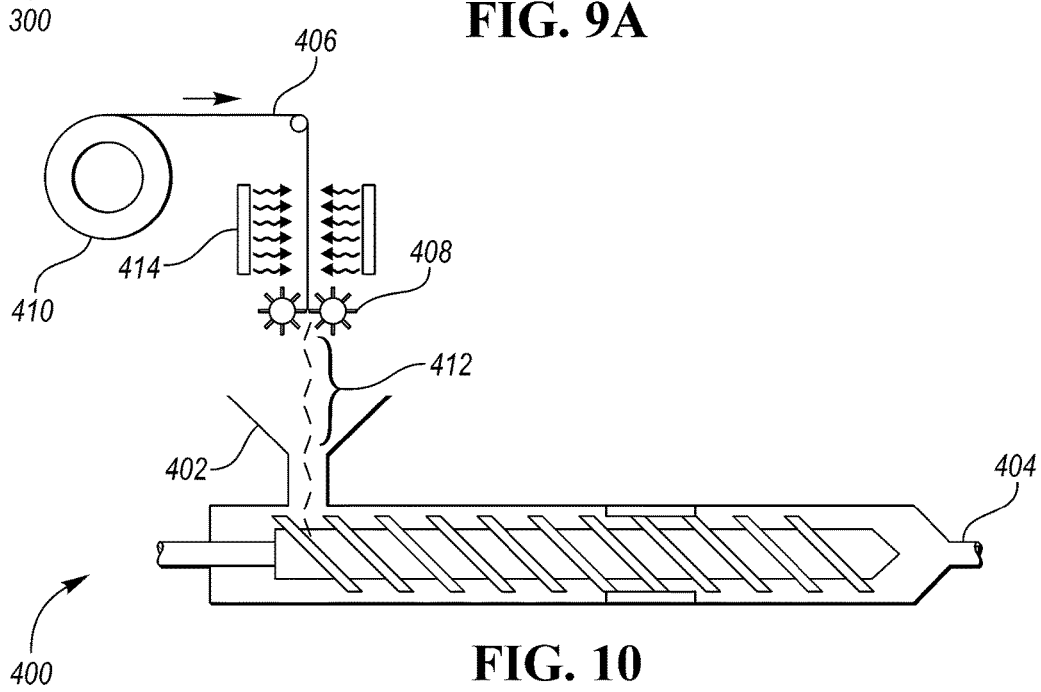
FIG. 10 depicts an extrusion system according to yet another embodiment.

FIG. 10 depicts an extrusion system 400 according to yet another embodiment of the present disclosure. Extrusion system 400 includes input port 402 and exit port 404. As shown in FIG. 10, a pre-impregnated continuous tape 406 of composite material is fed into cutting element 408. The pre-impregnated continuous tape 406 can include continuous, discontinuous, or a combination of fiber lengths formulated for an intended application. The pre-impregnated continuous tape 406 can be delivered from a coil 410 of the composite material. The cutting element 408 divides pre-impregnated continuous tape 406 into flakes 412. Examples of form factors for the flakes are disclosed above. Before the pre-impregnated continuous tape 406 is divided into flakes 412, a heater 414 can be used to heat pre-impregnated continuous tape 406 or alternatively, pre-impregnated flakes 412. The flakes 412 are introduced into input port 402 at a predetermined rate. For injection molding relatively small parts, the rate can be selected from any following value or range of two following values: 10 lbs/hour, 20 lbs/hour, 30 lbs/hour, 40 lbs/hour or 50 lbs/hour. For compression molding larger parts, the rate can be selected from any following value or range of two following values: 100 lbs/hour, 200 lbs/hour, 300 lbs/hour, 400 lbs/hour, 500 lbs/hour, 600 lbs/hour, 700 lbs/hour, 800 lbs/hour, 900 lbs/hour or 1,000 lbs/hour. For blow molding very large parts, the rate can be selected from any following value or range of two following values: 500 lbs/hour, 1,000 lbs/hour, 1,500 lbs/hour, 2,000 lbs/hour, or 2,500 lbs/hour. For continuous extrusion processes, the rate can be selected from any following value or range of two following values: 1,000 lbs/hour, 2,000 lbs/hour, 3,000 lbs/hour, 4,000 lbs/hour, 5,000 lbs/hour. In an alternative embodiment to the in-line cutting described above in this paragraph, the flakes can be pre-cut from pre-impregnated continuous tape offline, stored in bulk, and directly dosed to input port 402. A melted stream is formed within the extrusion system 400. The molding compound exits extrusion system 400 at exit port 404 appropriately configured for the intended process and can be used to produce a composite part using any suitable molding process, e.g., compression molding, extrusion, injection molding or blow molding.

A part made form a molding process may have a fiber content typically ranging from 10% to 60% weight fraction. In one embodiment, the pre-impregnated continuous tape 406 may have a similar or about the same fiber content as the part. As a benefit of one or more embodiments, if no additional functionality is required, then producing the pre-impregnated tape 406 at about the same fiber content of the part eliminates any shear required for blending. Also, the pre-impregnated tape 406 may represent the entirety of the material used to produce the part. This is not the case in previous approaches where poorly impregnated strands produced inline are introduced back into a melt stream of the same polymeric material, thereby diluting the fiber concentration and requiring additional blending.

By following the process depicted in FIG. 10, flakes can be produced from a tape or thin sheet and dosed into an extruder. Such process improves control over the initial fiber lengths as flake can be prepared to a specific size or combination of sizes. Moreover, should the initial size exceed what can be readily conveyed or dosed gravimetrically, then such tape or sheets can be introduced in-line at a controlled rate whereby the tape or sheet is shredded or cut in a manner to dose the flake at a designated size directly into an extruder. Alternatively, if the geometries of the flake can be conveyed and dosed, then the flake can be prepared in advance from the tape or sheet and delivered in bulk. Since flakes are more flexible then pellets, as the flakes initially encounter the screw of the extruder and begin the melt phase, they are less likely to cause damage to adjacent flakes. As another benefit, flakes have a preferential aspect ratio in terms of area/unit mass, and therefore, the flake will absorb heat more rapidly and evenly than pellets, making the flake less prone as it melts to damage fiber within the developing melt stream.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The following applications are related to the present application: U.S. patent application Ser. No. 15/657,741, U.S. patent application Ser. No. 15/657,863, U.S. patent application Ser. No. 15/657,934, and U.S. patent application Ser. No. 15/657,770, all filed on Jul. 24, 2017. Each of the identified applications is incorporated by reference herein in its entirety.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method comprising:
   establishing a melt stream of a source material including a first polymeric material in an extruder;
   dosing a composite material into the melt stream, the composite material including pre-impregnated reinforcing fibers comprising reinforcing filaments and a second polymeric material, the composite material having at least 30% of the reinforcing filaments protected by the first polymeric material such that the first polymeric material surrounds each filament completely forming a barrier between it and an adjacent filament in the at least 30% of the filaments;
   forming a molding compound from the source and composite materials;
   dispensing the molding compound from the extruder, the first and second polymeric materials being different than each other to introduce a functionality into the molding compound that is not present in the second polymeric material; and
   using the molding compound to produce a part.

2. The method of claim 1, wherein the source material includes a first resin having a first molecular weight and a first viscosity and the composite material includes a second resin having a second molecular weight and second viscosity, and the first molecular weight is greater than the second molecular weight or the first viscosity is greater than the second viscosity.

3. The method of claim 2, wherein the first and second resins are in the same resin family.

4. The method of claim 1, wherein the source material includes a first resin and an additive, filler and/or nanoparticle abrasive to dry reinforcing fibers.

5. The method of claim 1, wherein the source material includes a first resin having a first viscosity and an additive, filler and/or nanoparticle affecting the first viscosity.

6. The method of claim 1, wherein the source material includes a first resin and an additive, filler and/or nanoparticle such that a viscosity of the first polymeric material is greater than a viscosity of the second polymeric material.

7. The method of claim 1, wherein the source material includes a first resin and the composite material includes a second resin, and the first and second resins are from different resin families.

8. The method of claim 1, wherein the dosing step includes lubricating the composite material with the melt stream of the source material.

9. The method of claim 1, wherein the dosing step includes dosing the composite material in a solid form into the melt stream and the melt stream at least partially melting the composite material.

10. The method of claim 1, wherein the composite material is in a form of one or more continuous strands.

11. The method of claim 1, wherein the composite material is in a form of a pellet or flake.

12. The method of claim 11, wherein the dosing step is carried out using a side feeder.

13. The method of claim 1, wherein the reinforcing fibers include carbon fiber, glass fiber, synthetic fiber, natural fiber or combinations thereof.

14. The method of claim 1, further comprising heating the composite material before the dosing step.

15. The method of claim 1, wherein each of the first and second polymeric materials include a thermoplastic polymer material.

16. The method of claim 1, wherein each of the first and second polymeric materials is a thermoset polymeric material.

17. The method of claim 1, wherein the composite material having at least 50% of the filaments protected by the polymeric material such that the polymeric material surrounds each filament completely forming a barrier between it and an adjacent filament in the at least 50% of the filaments.

18. The method of claim 1, wherein the establishing step includes establishing the melt stream in a first extruder and the dosing step includes combining the melt stream with the composite material in a second extruder.

* * * * *

UNITED STATES PATENT AND TRADEMARK OFFICE
CERTIFICATE OF CORRECTION

PATENT NO. : 10,011,049 B1  
APPLICATION NO. : 15/657948  
DATED : July 3, 2018  
INVENTOR(S) : Christopher Johnston, VII Page 1 of 1

It is certified that error appears in the above-identified patent and that said Letters Patent is hereby corrected as shown below:

In the Claims

Column 17, Line 17, Claim 1:
After "by the"
Delete "first"
Insert -- second --.

Column 17, Line 17, Claim 1:
After "such that the"
Delete "first"
Insert -- second --.

Column 18, Line 35, Claim 17:
Before the first instance of "polymeric material"
Insert -- second --.

Column 18, Line 35, Claim 17:
Before the second instance of "polymeric material"
Insert -- second --.

Signed and Sealed this  
Tenth Day of November, 2020

Andrei Iancu  
*Director of the United States Patent and Trademark Office*